(12) United States Patent
Fredinburg et al.

(10) Patent No.: US 8,897,484 B1
(45) Date of Patent: Nov. 25, 2014

(54) IMAGE THEFT DETECTOR

(75) Inventors: Dan Fredinburg, San Fancisco, CA (US); Ross Graber, Mountain View, CA (US)

(73) Assignee: Google Inc., Mountain View, CA (US)

( * ) Notice: Subject to any disclaimer, the term of this patent is extended or adjusted under 35 U.S.C. 154(b) by 371 days.

(21) Appl. No.: 13/475,629

(22) Filed: May 18, 2012

(51) Int. Cl.
*G06Q 50/00* (2012.01)
*G11B 20/00* (2006.01)
*G06F 21/10* (2013.01)

(52) U.S. Cl.
CPC .......... *G11B 20/00855* (2013.01); *G06Q 50/01* (2013.01); *G06F 21/10* (2013.01)
USPC ............................. 382/100; 382/252; 705/319

(58) Field of Classification Search
CPC ................... G11B 20/00086; G11B 20/00166; G11B 20/00173; G11B 20/00181; G11B 20/00731; G11B 20/00855; G11B 20/00884; G06Q 50/01; G06Q 2220/16; G06F 21/10; G06F 2221/0733; H04N 2005/91335; H04N 2005/91342
USPC ............... 382/100; 386/252, 260; 705/57, 58, 705/319, 901, 911; 713/168, 176, 179
See application file for complete search history.

(56) References Cited

U.S. PATENT DOCUMENTS

| | | | |
|---|---|---|---|
| 7,359,894 B1 | 4/2008 | Liebman et al. | 707/3 |
| 7,565,139 B2 | 7/2009 | Neven, Sr. et al. | 455/414.3 |
| 7,593,740 B2 | 9/2009 | Crowley et al. | 455/456.3 |
| 7,613,769 B1 | 11/2009 | Hess | 709/203 |
| 7,680,770 B1 | 3/2010 | Buyukkokten et al. | 707/3 |
| 7,716,140 B1 | 5/2010 | Nielsen et al. | 705/319 |
| 8,010,459 B2 | 8/2011 | Buyukkokten et al. | 705/319 |
| 8,015,119 B2 | 9/2011 | Buyukkokten et al. | 705/319 |
| 8,019,875 B1 | 9/2011 | Nielsen | 709/227 |
| 8,209,330 B1 | 6/2012 | Covell et al. | 707/728 |
| 2004/0148347 A1 | 7/2004 | Appelman et al. | 709/204 |
| 2005/0060417 A1 | 3/2005 | Rose | 709/228 |
| 2006/0047725 A1 | 3/2006 | Bramson | 707/204 |
| 2008/0134294 A1 | 6/2008 | Mattox et al. | 726/4 |
| 2009/0165031 A1* | 6/2009 | Li et al. | 725/22 |
| 2009/0327488 A1 | 12/2009 | Sampat et al. | 709/224 |
| 2010/0191824 A1 | 7/2010 | Lindsay | 709/217 |
| 2011/0038512 A1 | 2/2011 | Petrou et al. | 382/118 |
| 2011/0179117 A1 | 7/2011 | Appelman et al. | 709/204 |

(Continued)

FOREIGN PATENT DOCUMENTS

WO    WO/2011/017653 A1    10/2011    ............. G06F 17/30

OTHER PUBLICATIONS

Jason Kincaid, "Google Apps to Get Unified Search in the Not-Too-Distant Future". downloaded from http://techcrunch.com/2010/05/20/google-apps-to-get-unified-search-in-the-not-too-distant-future/ on Jul. 14, 2012.

(Continued)

*Primary Examiner* — Andrew W Johns
(74) *Attorney, Agent, or Firm* — Procopio, Cory, Hargreaves & Savitch LLP

(57) ABSTRACT

At a social network server, a request is obtained from a first user to upload a digital visual medium (digital photograph or digital video). The digital visual medium is marked for identification thereof. At the social network server, a request is obtained from a second user to upload the digital visual medium. Based on the marking, it is determined whether the request from the second user to upload the digital visual medium is inappropriate.

31 Claims, 6 Drawing Sheets

(56) References Cited

U.S. PATENT DOCUMENTS

| | | | |
|---|---|---|---|
| 2011/0202968 A1* | 8/2011 | Nurmi | 726/1 |
| 2012/0063635 A1* | 3/2012 | Matsushita et al. | 382/100 |
| 2012/0109858 A1 | 5/2012 | Makadia et al. | 706/12 |
| 2012/0250951 A1* | 10/2012 | Chen | 382/118 |

OTHER PUBLICATIONS

"Google Unified Search" downloaded from http://www.ghacks.net12009/07/20/google-unified-search/ on Jul. 14, 2012.

"Find my Face" downloaded from http://support.google.com/plus/bin/answer.py?hl=en&answer=2370300 on Jun. 20, 2012.

"Put on Your Sunglasses! Facial Recognition Is Going Social" downloaded from http://socialmediatoday.com/e-marketing-sensible-folk/278367/facesearch on Nov. 1, 2011.

"Face Recognition Study—FAQ" downloaded from http://www.heinz.cmu.edut/~acquisti/face-recognition-study-FAQ/ on Nov. 1, 2012.

"Google Goggles" downloaded from http://www.google.com/mobile/goggles/#text on Nov. 1, 2011.

"Content-based image retrieval" downloaded from http://en.wikipedia.org/wiki/Content-based_image_retrieval on Jun. 21, 2012.

Tamara L. Berg, et al. "Names and Faces". Preprint submitted to IJCV. U. Cal. at Berkeley, Dept. of Computer Science (undated).

Dan Fredinburg., "Image Search Privacy Protection Techniques" unpublished U.S. Appl. No. 13/553,500, filed Jul. 19, 2012.

"Digital watermarking" downloaded from http://en.wikipedia.org/wiki/Digital_watermarking on Apr. 25, 2012.

"Digital video fingerprinting" downloaded from http://en.wikipedia.org/wiki/Digital_video_fingerprinting on Apr. 25, 2012.

"Exchangeable image file format" downloaded from http://en.wikipedia.org/wiki/Exchangeable_image_file_format on Apr. 25, 2012.

"Google+" downloaded from http://en.wikipedia.org/wiki/Google_%2B on Apr. 25, 2012.

"Sockpuppet (Internet)" downloaded from http://en.wikipedia.org/wiki/Sockpuppet_(Internet) on Apr. 25, 2012.

"Facial recognition system" downloaded from http://en.wikipedia.org/wiki/Facial_recognition_system on May 15, 2012.

Chloe Albaesius, Google+ Photos get Automatic 'Find my Face' Recognition, PC Magazine Dec. 8, 2011 pp. 1-4.

Anonymous, "How about a facial recognition Google Search," downloaded from http://productforums.google.com/forum/ on May 15, 2012.

* cited by examiner

IMAGE THEFT DETECTOR

TECHNICAL FIELD

The subject matter described herein relates to information technology, and, more particularly, to techniques for detecting the theft of images or other inappropriate or unauthorized image use.

BACKGROUND INFORMATION

There are a variety of instances of the unauthorized use of images. For example, to gather material for creation of so-called sock puppet accounts (on-line identities used for inappropriate purposes such as deception), scripts harvest images from real user's profiles. Other reasons for unauthorized use of images include cyber-bullying, impersonation, and the like. The unauthorized use of an image can cause harm to the innocent owner of the image.

SUMMARY

Described herein are techniques for image theft detection. In one aspect, an exemplary method of monitoring for inappropriate use of a digital visual medium includes the steps of obtaining, at a social network server, a request from a first user to upload a digital visual medium; marking the digital visual medium; obtaining, at the social network server, a request from a second user to upload the digital visual medium; and, based on the marking, determining whether the request from the second user to upload the digital visual medium is inappropriate.

In another aspect, another exemplary method of monitoring for inappropriate use of a digital visual medium includes the steps of identifying a social network account as potentially illegitimate; responsive to the identifying, generating at least one facial recognition score for at least one image of a face in at least one digital visual medium associated with the potentially illegitimate social network account; comparing the at least one facial recognition score to a database of facial recognition scores for legitimate users of the social network; and initiating remedial action if the comparing indicates a potential illegitimate use of the digital visual medium associated with the potentially illegitimate social network account.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments described herein or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments described herein or elements thereof can be implemented in the form of an apparatus, such as a social network server apparatus, including a memory and at least one processor that is coupled to the memory and operative to perform, or facilitate performance of, exemplary method steps. Yet further, in another aspect, one or more embodiments described herein or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Embodiments described herein can provide substantial beneficial technical effects. For example, one or more embodiments may provide one or more of the following advantages:

greatly increased detection coverage for photo misuse;
automation of the end-to-end detection pipeline, previously largely done in segments manually.

These and other features and advantages will become apparent from the following detailed description of illustrative embodiments, which is to be read in connection with the accompanying drawings.

DETAILED DESCRIPTION

Figure 1:
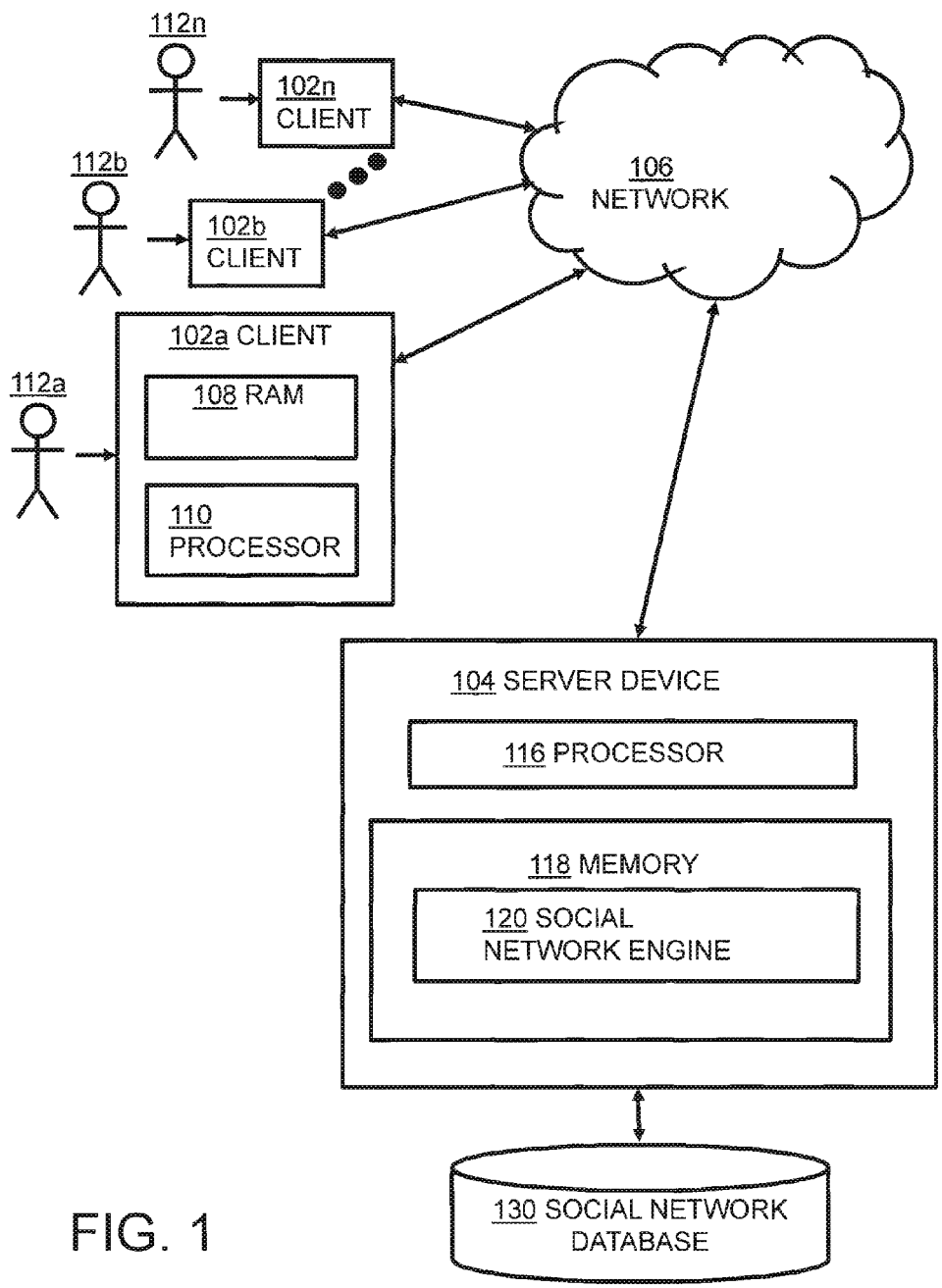
FIG. 1 illustrates a diagram of a social network system.

FIG. 1 is a diagram illustrating an exemplary social network. The system 100 shown in FIG. 1 includes multiple client devices 102*a-n* in communication with a server device 104 over a network 106. In some embodiments, the network 106 is the Internet. In other embodiments, other networks, such as an intranet, WAN, or LAN may be used.

The client devices 102*a-n* shown each include a computer-readable medium, such as a random access memory (RAM) 108 coupled to a processor 110. The processor 110 executes computer-executable program instructions stored in memory 108. Such processors may include, for example, microprocessors, ASICs, and state machines. Such processors include and/or are in communication with, media, for example computer-readable media, storing instructions that, when executed by the processor, cause the processor to perform the steps described herein. Computer-readable media are discussed further below in connection with FIG. 4. The instructions may include code from any computer-programming language, including, for example, C, C++, C#, Visual Basic, Java, Python, Perl, JavaScript, and the like. Some embodiments make use of Java, C++, and/or Python using distributed systems technologies such as MapReduce.

Client devices 102*a-n* may also include a number of external or internal devices such as a mouse, a CD-ROM, DVD, a keyboard, a display, or other input or output devices. Examples of client devices 102*a-n* are personal computers, digital assistants, personal digital assistants, cellular phones, mobile phones, smart phones, pagers, digital tablets, laptop computers, Internet appliances, and other processor-based devices. In general, a client device 102*a* may be any type of processor-based platform that is connected to a network 106 and that interacts with one or more application programs.

Client devices 102a-n may operate on any operating system capable of supporting a browser or browser-enabled application, such as the Microsoft® Windows® operating system (registered marks of Microsoft Corporation, Redmond, Wash., US), the Linux® operating system (registered mark of Linus Torvalds, Portland, Oreg. US), the iOS operating system used by Apple Inc. or the OS X® operating system (registered mark of Apple Inc., Cupertino, Calif. US). The client devices 102a-n shown include, for example, personal computers executing a browser application program such as the Google Chrome™ browser (mark of Google Inc., Mountain View, Calif., US), Microsoft Corporation's Internet Explorer® browser (registered mark of Microsoft Corporation, Redmond, Wash., US), Apple Inc.'s Safari® browser (registered mark of Apple Inc., Cupertino, Calif. US), or the Firefox® browser (registered mark of Mozilla Foundation, Mountain View, Calif. US).

Through the client devices 102a-n, users 112a-n can communicate over the network 106 with each other and with other systems and devices coupled to the network 106. As shown in FIG. 1, a server device 104 is also coupled to the network 106.

The server device 104 shown includes a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Non-limiting examples of social network services include the Google+® service (registered mark of Google Inc., Mountain View, Calif., US), the Facebook® service (registered mark of Facebook, Inc. Palo Alto, Calif., US), and the Orkut® service (registered mark of Google Inc., Mountain View, Calif., US).

Social networks can include any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown includes a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif., US and Advanced Micro Devices, Inc. (AMD) of Sunnyvale, Calif., US.

Memory 118 contains a social network engine application program, also known as a social network engine 120. The social network engine 120 facilitates members, such as user 112a, interacting with and participating in a social network. A social network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, sense of humor, fashion preferences, pets, hometown location, passions, sports, activities, favorite books, music, TV, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile. Additionally, entries within a profile can include associations with other profiles. Associations between profiles within a social network can include, for example, friendships, business relationships, acquaintances, community associations, activity partner associations, common interest associations, common characteristic associations, or any other suitable type of association between profiles.

A social network can also include communities. Communities within a social network can represent groups of members sharing common interests or characteristics. Communities can include sub-communities, and multiple communities can be arranged into global communities. Sub-communities can include groups of profiles within a larger community that share common interests or characteristics independent from the entire community. For example, a "basketball players" community can include members who enjoy playing basketball from all around the world. A sub-community within the basketball community can include members specific to a local geographical area. Thus, users in California can form a "California basketball players" community. Global communities can include groups of communities sharing similar characteristics. For example, the "basketball players" community and a "basketball watchers" community can be grouped under a global "basketball" community.

Server device 104 also provides access to storage elements, such as a social network storage element, in the example shown in FIG. 1, a social network database 130. The social network database 130 can be used to store member profiles. Data storage elements may include any one or combination of methods for storing data, including without limitation, arrays, hash tables, lists, and pairs. Other similar types of data storage devices can be accessed by the server device 104. The social network engine 120 can receive data, including the members' profiles, from the social network database 130 and can also send data including member profiles to the social network database 130 for storage. The social network database 130 may be physically attached or otherwise in communication with the social network engine 120 by way of a network or other connection.

It should be noted that some embodiments may include systems having different architecture than that which is shown in FIG. 1. The system 100 shown in FIG. 1 is merely exemplary, and is used to help explain the social networks and methods illustrated in FIGS. 2-4.

Figure 2:
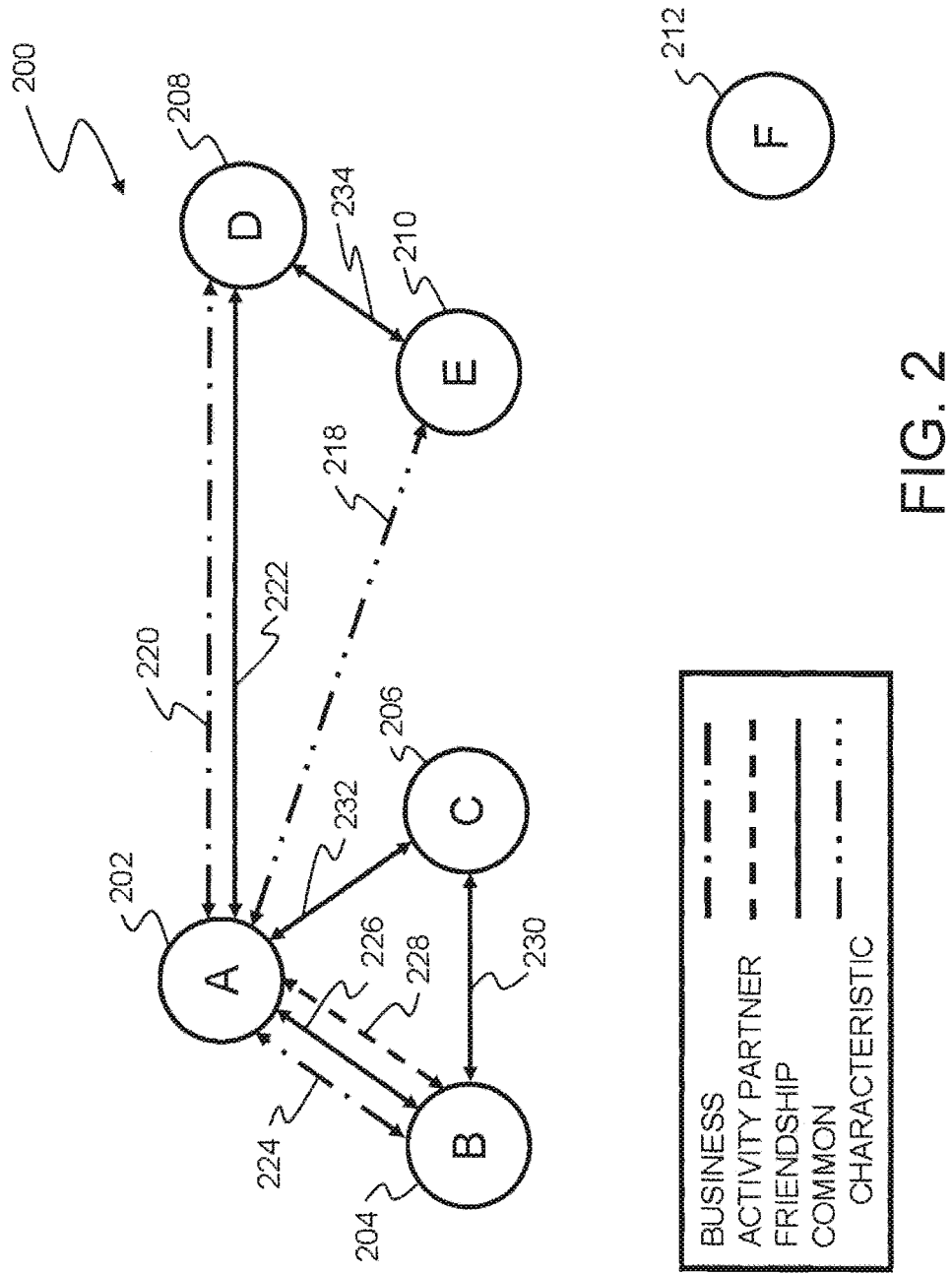
FIG. 2 illustrates relationships in a social network.

FIG. 2 illustrates an exemplary embodiment of a social network 200. According to the embodiment illustrated in FIG. 2, the social network 200 includes a graph with vertices 202-212 and edges 218-234. The vertices 202-212 include Profiles A-F. Each profile can represent a member. The edges 218-234 include associations between profiles. According to the embodiment shown in FIG. 2, the social network 200 includes a plurality of differing types of associations represented by edges 218-234. The types of associations listed in FIG. 2 for illustration purposes are business associations, activity partner associations, friendship associations, community associations, and common characteristic associations. Common characteristic associations can include associations based on some characteristic such as attending the same high school or being from the same hometown, but can indicate a lower level of significance that another type of association, such as a friendship association.

For example, edge 220 and edge 222 each include an association between Profile A at vertex 202 and Profile D at vertex 208. The edge 220 represents a business association, and the edge 222 represents a friendship association. Profile A is also associated with Profile E by a common characteristic association including edge 218. The association between Profile A and Profile E may be more attenuated than the association between Profiles A and D, but the association can still be represented by the social network depicted in FIG. 2.

Each member represented by the Profiles A-F including the vertices 202-212, for purposes of illustration, is a person. Other types of members can be in social network 200. The associations 218-234 illustrated in FIG. 2 include bi-directional associations. The associations are bi-directional because when one profile, for example Profile A, is associated with another profile, for example Profile D, then Profile D is also associated with Profile A. Members A and D will typically not be associated with each other until both profiles consent to such association; e.g., A may invite D to be associated therewith, and the association occurs upon D's acceptance of such invitation. The invitation, for example, may include sending an email or other message to D indicating that A has requested an association with D.

Other embodiments may include directed associations or other types of associations. Directed associations associate a first profile with a second profile while not requiring the second profile to be associated with the first profile. For example, in a directed chart, Profile A can be associated by a friendship association with Profile B, and Profile B can be unassociated by a friendship connection with Profile A. Thus, a display of Profile A's friends would include Profile B, but a display of Profile B's friends would not include Profile A.

Within a social network, a degree of separation can be determined for associated profiles. One method of determining a degree of separation is to determine the fewest number of edges of a certain type separating the associated profiles. This method of determining a degree of separation can produce a type-specific degree of separation. A type-specific degree of separation is a degree of separation determined based on one particular type of association. For example, a Profile A has a friend association degree of separation of two from Profile E. The fewest number of friendship associations between Profile A and Profile E is two—the friendship association including edge 220 and the friendship association including edge 234. Thus, for the associated Profiles A and E, the degree of friendship separation, determined according to one aspect of one embodiment disclosed herein, is two.

Another type-specific degree of separation can also be determined for Profiles A and E. For example, a common characteristic degree of separation can be determined by determining the fewest number of common characteristic associations separating Profile A and Profile E. According to the embodiment depicted in FIG. 2, there is one common characteristic association, including edge 218, separating Profiles A and E. Thus, the common characteristic association degree of separation, according to the embodiment depicted in FIG. 2, is one. The common characteristic, in this example, can be that Profile A attended the same high school as Profile E. A common characteristic association may be selected by Profiles A and E to represent that they are associated in some fashion, but to not create a close association such as with a friendship association.

According to other aspects of some embodiments, the degree of separation may be determined by use of a weighting factor assigned to each association. For example, close friendships can be weighted higher than more distant friendships. According to certain aspects of some embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations contribute less to the resulting sum than lower weighted associations.

Some embodiments enable the identification of images that are likely instances of image theft and/or unauthorized reuse.

In some embodiments, detection and determination is performed using a combination of watermarking, fingerprinting, and/or logging to track the spread of images across a social network.

For example, suppose a malicious user X steals a photo from user Y in order to create a so-called sock puppet (on-line identity used for inappropriate purposes such as deception). In some embodiments, user Y uploads the photo, and an operator of a social networking site modifies the uploaded photo to include EXIF meta data or the like regarding the location and use of this photo. X downloads this photo and attempts to use it in a profile of his or her own. The operator of the social networking site detects the EXIF meta data or the like and determines the use is inappropriate. Optionally, the use is then denied and/or user Y is advised of the inappropriate actions by user X.

In some embodiments, a false positive can be handled, for example, as follows. In the event user W takes a photo from his or her friend user Z in order to share it on user W's account (for example, not using built-in re-sharing options). Using the same approach as in the previous paragraph, the EXIF data can be used to detect the reuse of the photo; however, other connections such as social graph distance (as explained, for example, in connection with FIG. 2) can be used to remove false positives.

Figure 3:
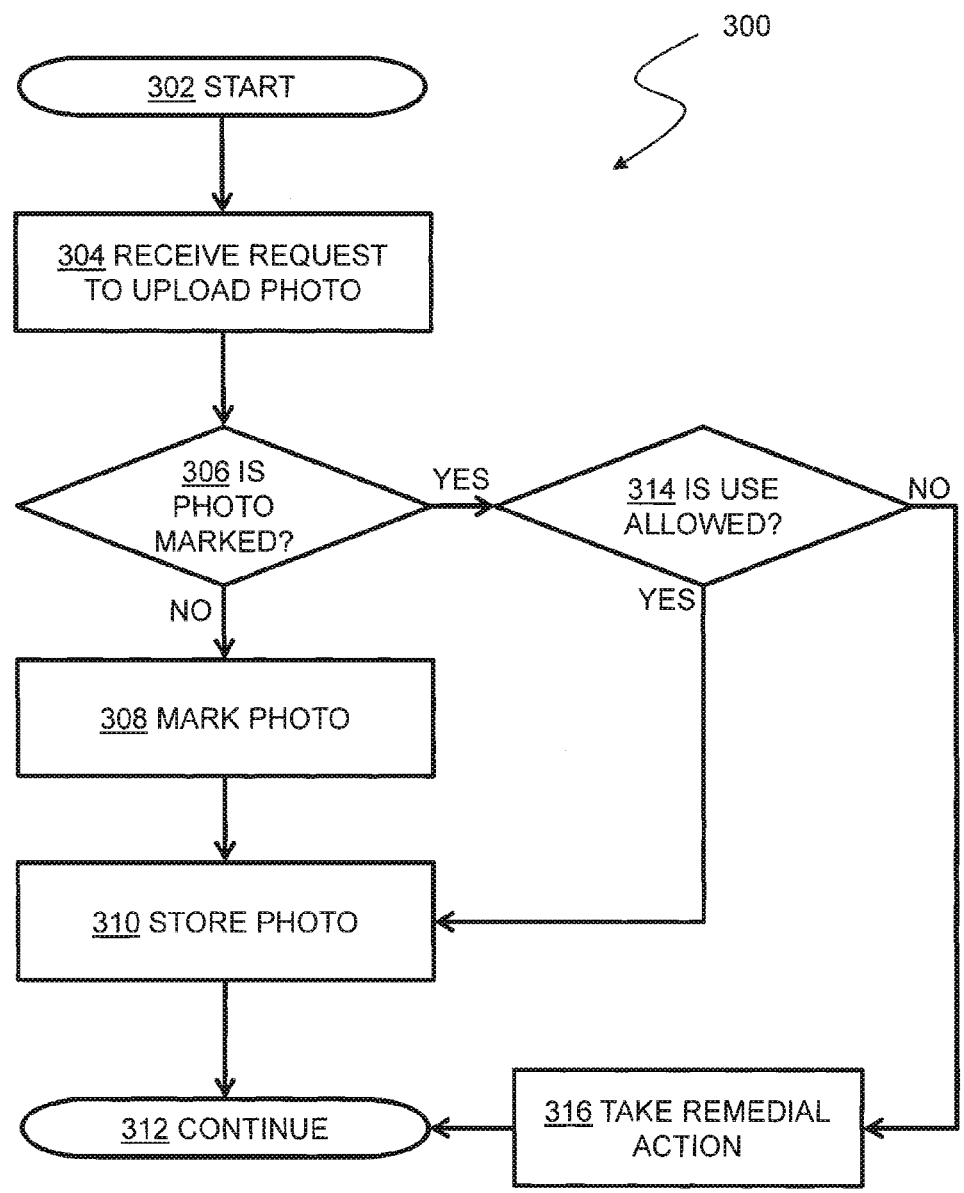
FIG. 3 is an exemplary flow chart.

Refer again to FIG. 1, and also to flow chart 300 of FIG. 3, which begins at 302. Suppose user Y corresponds to user 112a with client 102a, and user X corresponds to user 112b with client 102b. User Y uploads the photo from client 102a to social network engine 120 over network 106, as per step 304. Server device 104 running social network engine 120 is operated by or for an operator of a social networking site. Engine 120 receives the upload of the photo from user Y. In some embodiments, before storing the photo in social network database 130, as at 310, social network engine 120 marks the photo, as at 308. In other embodiments, the photo may first be stored in social network database 130 but is not made visible to others until it is marked. In some cases, for reasons that will be apparent from the next paragraph, a check is made as at 306 to see if the photo that is desired to be uploaded is marked. Assume in this case that the photo that user Y wants to store is not marked ("NO" branch of decision block 306).

Once the photo is modified and made visible to others, user X accesses social network engine 120 from his or her client 102b over network 106. User X may view the photo on, for example, user Y's social network page. User X downloads the photo from social network database 130 by interacting with social network engine 120 on server device 104 via client 102b over network 106. User X then attempts to use the photo in his or her own profile or on a false profile created by user X. In doing this, user X attempts to upload the photo from client 102b to social network engine 120 over network 106, as per step 304. Engine 120 receives the purported upload of the photo from user X. In some embodiments, before storing the photo in social network database 130 in step 310, social network engine 120 verifies the photo for legitimacy as in decision blocks 306 and 314. In other embodiments, the photo may first be stored in social network database 130 but is not made visible to others until it is verified. Here, social network engine 120 in step 306 ("YES" branch) detects the modification made when user Y uploaded the photo and determines in decision block 314 ("NO" branch) that use by user X is not appropriate. Storage in social network database 130 may be denied, or if already stored, the photo is not made visible to others and may be removed. Other actions may be taken. Remedial action in general is seen at step 316. Other examples include notifying user Y of the attempted inappropriate use and/or admonishing user X or taking other appropriate action against him or her.

On the other hand, if the photo is marked but the use is acceptable, as per the "YES" branch of decision block 314, the photo may be stored, or if already stored, made available for appropriate use.

Processing continues at step 312.

A variety of techniques can be used in decision block 314 to determine whether use is allowed. In some cases, use of a tagged photo could be disallowed by anyone but the original uploader, unless the photo is shared via an approved built-in re-sharing feature. In some cases, use of a tagged photo could be disallowed by anyone but the original uploader, unless the original uploader gives consent after being contacted by e-mail or the like once the attempted use of the marked photo is detected. For these purposes, verification module 504, discussed elsewhere herein, can include logic to compare an identifier of an original uploader, associated with a digital visual medium, against an identifier of a subsequent putative uploader of the medium. In some cases, as discussed above, other connections such as social graph distance (as explained, for example, in connection with FIG. 2) can be used to determine whether the proposed use is allowable.

A variety of techniques can also be used to carry out watermarking, fingerprinting, and/or logging in step 308, and subsequent detection thereof in step 306. Some embodiments, as noted, use EXIF meta data. Exchangeable image file format (EXIF) is a standard that specifies the formats for images, sound, and ancillary tags used by digital cameras (including smartphones), scanners and other systems handling image and sound files recorded by digital cameras. The specification uses certain existing file formats with the addition of specific metadata tags: JPEG DCT (discrete cosine transform) for compressed image files, and TIFF Rev. 6.0 (RGB color model or YCbCr color space) for uncompressed image files. The metadata tags defined in the EXIF standard include date and time information; camera settings; a thumbnail for previewing the picture on the camera's LCD screen, in file managers, or in photo manipulation software; descriptions; geotags (geographical location where the photo was taken); and/or copyright information. In some cases, the uploaded image already has EXIF tags and marking step 308 includes merely noting the tags in a database; in other cases, the uploaded image does not have EXIF tags and the same are added in step 308; in still other cases, the uploaded image already has EXIF tags but the same are not suitable for marking the photo for purposes of carrying out step 314, and thus additional EXIF tags are added in step 308. Meta data tags can, in general, be stored in the picture files. Tags can be detected, for example, with a parser.

Use of EXIF meta data tags is but one non-limiting example of a suitable marking process. Digital watermarking is the process of embedding information into a digital signal, such as video or pictures, which information may be used to verify its authenticity or the identity of its owners, in the same manner as paper bearing a watermark for visible identification. Digital watermarking is used in one or more embodiments. In one or more embodiments, digital watermarks are stored in the images themselves and are detected using pattern recognition techniques.

Digital fingerprinting involves extracting several unique features of a digital video or still picture, which can be stored as a fingerprint of the video or still content. The evaluation and identification of video or still content is then performed by comparing the extracted video fingerprints. The creation of a digital fingerprint involves the use of software that decodes the video or still data and then applies several feature extraction algorithms. Video or still fingerprints are highly compressed when compared to the original source file and can therefore be easily stored in databases for later comparison. Digital fingerprinting is used in one or more embodiments. In one or more embodiments, digital fingerprints are stored and detected in a manner similar to digital watermarks, but with a longitudinal component. A longitudinal component refers to an analysis that includes a time axis. For example, data is tracked regarding where the photo is being used (e.g., a geographic location such as New York or New Jersey) over time. If there is a sudden use of the photo in a geographically diverse location (say, Hong Kong), this suggests some kind of anomalous use (by way of example and not limitation, a use in a geographically diverse location within a time frame where it is physically impossible to travel between the locations in the elapsed time might be particularly indicative of a potential inappropriate use).

Logging can be carried out in one or more embodiments. A log is kept for each detected instance of a digital image, and analysis (e.g., time series or longitudinal) is used to determine the spreading of the image. A log of each account where a particular image occurs may be kept and the spreading of the image may be tracked. Longitudinal analysis is discussed above. A time series analysis could detect, for example, a sudden spike in usage. Logging includes maintaining a database of where a particular image is located in the social network.

Figure 5:
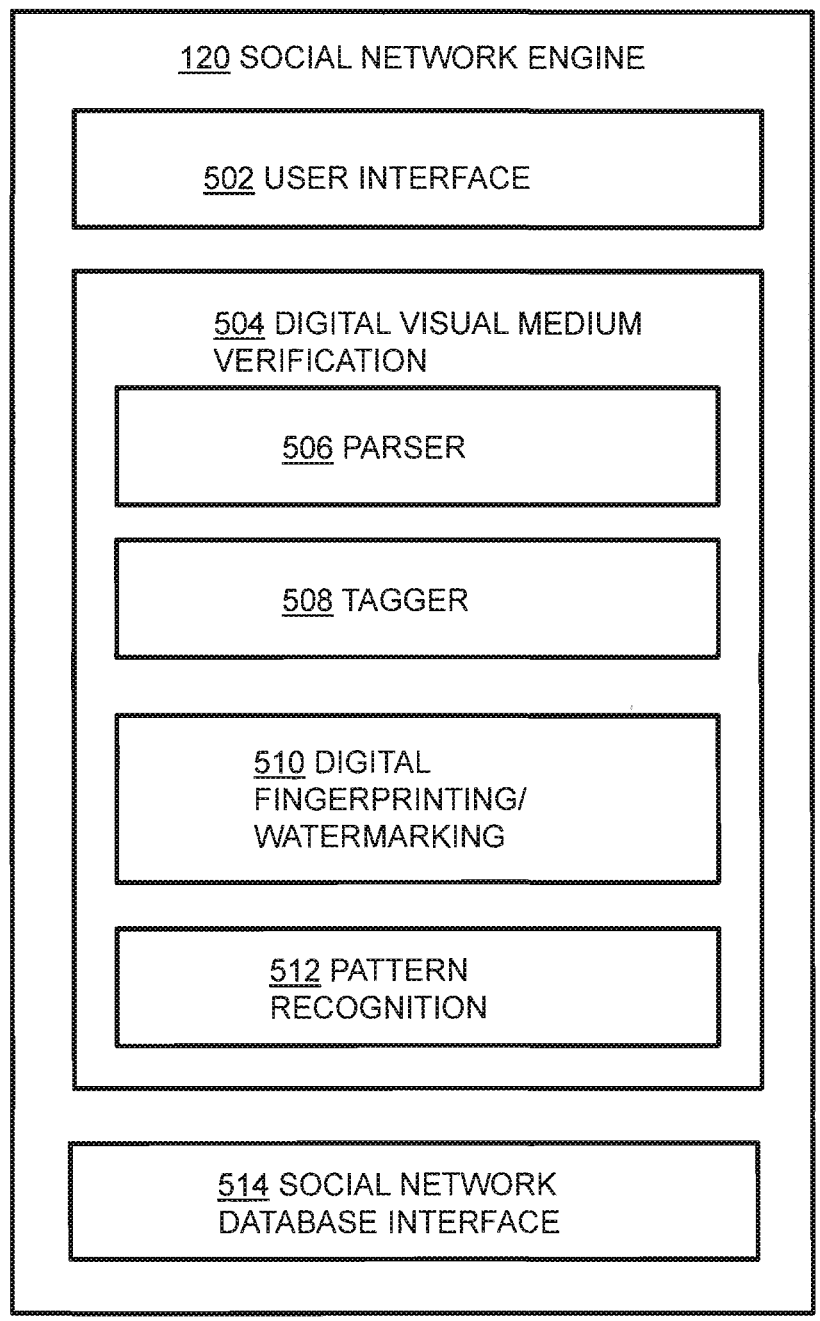
FIG. 5 is an exemplary software architecture diagram.

FIG. 5 shows an exemplary software architecture for the social network engine 120. A user interface or input/output module 502 communicates with users 112a-112n; for example, via packet-oriented communications over the Internet with a graphical user interface or the like on clients 102a-

102n (for example, browser software on the clients). A social network database interface module 514 controls storage of data in database 130, retrieval of data from database 130, and access to data in database 130. "Data" in this context includes, but is not limited to, digital photographs and digital videos and their associated tags, meta data, and the like. Digital visual medium verification module 504 includes functionality for marking the digital photographs and/or digital videos, and for using the markings to determine if use of the digital photographs and/or digital videos is appropriate for a given user in a given context. Module 504 can include, for example, a parser 506 to detect the EXIF meta data and a tagger 508 to tag digital photographs and/or digital videos with EXIF meta data. In addition, or alternatively, module 504 can include, for example, a digital fingerprinting and/or digital watermarking module 510 to fingerprint and/or watermark digital photographs and/or digital videos; and a pattern recognition module 512 to carry out facial modeling and facial recognition, and/or to detect the digital fingerprinting and/or digital watermarking. One non-limiting example of facial recognition software is Pittsburgh Pattern Recognition (PittPatt) software.

Given the discussion thus far, it will be appreciated that, in general terms, an exemplary method of monitoring for inappropriate use of a digital visual medium includes the step 304 of obtaining, at a social network server 104, a request from a first user (e.g., 112a) to upload a digital visual medium. A digital visual medium is expressly defined herein to include digital photographs and/or digital videos. This step can be carried out, for example, with user interface 502. A further step 308 includes marking the digital visual medium for identification thereof. This step can be carried out, for example, with digital visual medium verification module 504. A still further step (repetition of step 304 by another user) includes obtaining, at the social network server, a request from a second user (e.g., 112b) to upload the digital visual medium. This step can be carried out, for example, with user interface 502. An even further step (e.g., decision blocks 306 and 314) includes, based on the marking, determining whether the request from the second user to upload the digital visual medium is inappropriate. This step can be carried out, for example, with digital visual medium verification module 504.

Marking the digital visual medium for identification thereof can be implemented in a number of different fashions. In one or more instances, the marking facilitates associating the digital visual medium with a legitimate user, such as the first user mentioned above.

In some instances, the marking includes tagging with EXIF meta data; for example, using tagger 508. In such cases, the determining can include detecting the EXIF meta data with a parser 506.

In some instances, the marking includes digital watermarking; for example, with module 510. In such cases, the determining can include detecting the digital watermarking via pattern recognition (for example, with module 512).

In some instances, the marking includes digital fingerprinting; for example, with module 510. In such cases, the determining can include detecting the digital fingerprinting via pattern recognition with a longitudinal component (for example, with module 512).

In some instances, the marking includes storing, in a database (e.g., database 130), in association with the digital visual medium, a first facial recognition score; for example, with module 510. The score can be generated, for example, with pattern recognition module 512 or another component of engine 120. In such cases, the determining can include calculating a second facial recognition score on the digital visual medium sought to be uploaded by the second user (e.g., with pattern recognition module 512 or another component of engine 120); and comparing the first and second facial recognition scores for a match, with pattern recognition module 512 or another component of engine 120.

Facial recognition can be used in conjunction with any of the other techniques (e.g., tagging, watermarking, fingerprinting, or logging) or as an alternative. Facial models are, in and of themselves, known to the skilled artisan. Any suitable traditional or three-dimensional technique can be used (e.g., geometric, photometric, Principal Component Analysis using eigenfaces, Linear Discriminate Analysis, Elastic Bunch Graph Matching using the Fisherface algorithm, the Hidden Markov model, and/or the neuronal motivated dynamic link matching).

Traditional techniques typically identify faces by extracting landmarks, or features, from an image of the subject's face. For example, a given technique may analyze the relative position, size, and/or shape of the eyes, nose, cheekbones, and jaw. The extracted features are then used to search for other images with matching features. In some cases, the significant points of a face can be re-constructed, such as the end of nose, eyes, tips of ears, corners of mouth. The distance between all these points is typically almost identical on a person's photo, even if the person changes facial expression, moves, etc.

The facial model can be used to see if an attempt is being made to "re-upload" a photo or video. It can be determined whether that photo is of a person for which there is a photo in a database such as database 130. In some instances, the photo or video for which the upload or other use is attempted need not be the exact same photo in database 130 or the like. In some instances, facial recognition is used to quickly narrow down a selection of photos or videos to be reviewed so as to only look at photos or videos related to the individual in question.

In some embodiments, a further step 316 includes taking remedial action if the determining step indicates that the request from the second user to upload the digital visual medium is not appropriate. This step can be carried out, for example, with digital visual medium verification module 504.

In some embodiments, a further step (e.g., "NO" branch of 314) includes refraining from storing the digital visual medium in response to the request from the second user, if the determining step indicates that the request from the second user to upload the digital visual medium is not appropriate. This step can be carried out, for example, with digital visual medium verification module 504 including, in some cases, social network database interface 514.

In some embodiments, further steps include inaccessibly storing the digital visual medium in response to the request from the second user (e.g., storing in database 130 using interface 514 after step 304 for the second user), and refraining from making the digital visual medium available in response to the request from the second user, if the determining step indicates that the request from the second user to upload the digital visual medium is not appropriate (e.g., "NO" branch of 314; interface 514 will not permit access to the stored digital visual medium).

In another aspect, an exemplary method of monitoring for inappropriate use of a digital visual medium includes, as shown at 304, obtaining, at a social network server 104, a request from a first user (e.g., 112a) to upload a digital visual medium. This step can be carried out, for example, with user interface 502. A further step (one non-limiting detailed form of 308) includes tagging the digital visual medium with EXIF meta data (e.g., using tagger 508). A still further step (repetition of step 304 by another user) includes obtaining, at the social network server, a request from a second user (e.g., 112b) to upload the digital visual medium. This step can be carried out, for example, with user interface 502. Additional steps include, responsive to the request from the second user, detecting the EXIF meta data with a parser 506; and, based on the EXIF meta data detected by the parser, determining (e.g., step 314) whether the request from the second user to upload the digital visual medium is appropriate.

Figure 6:
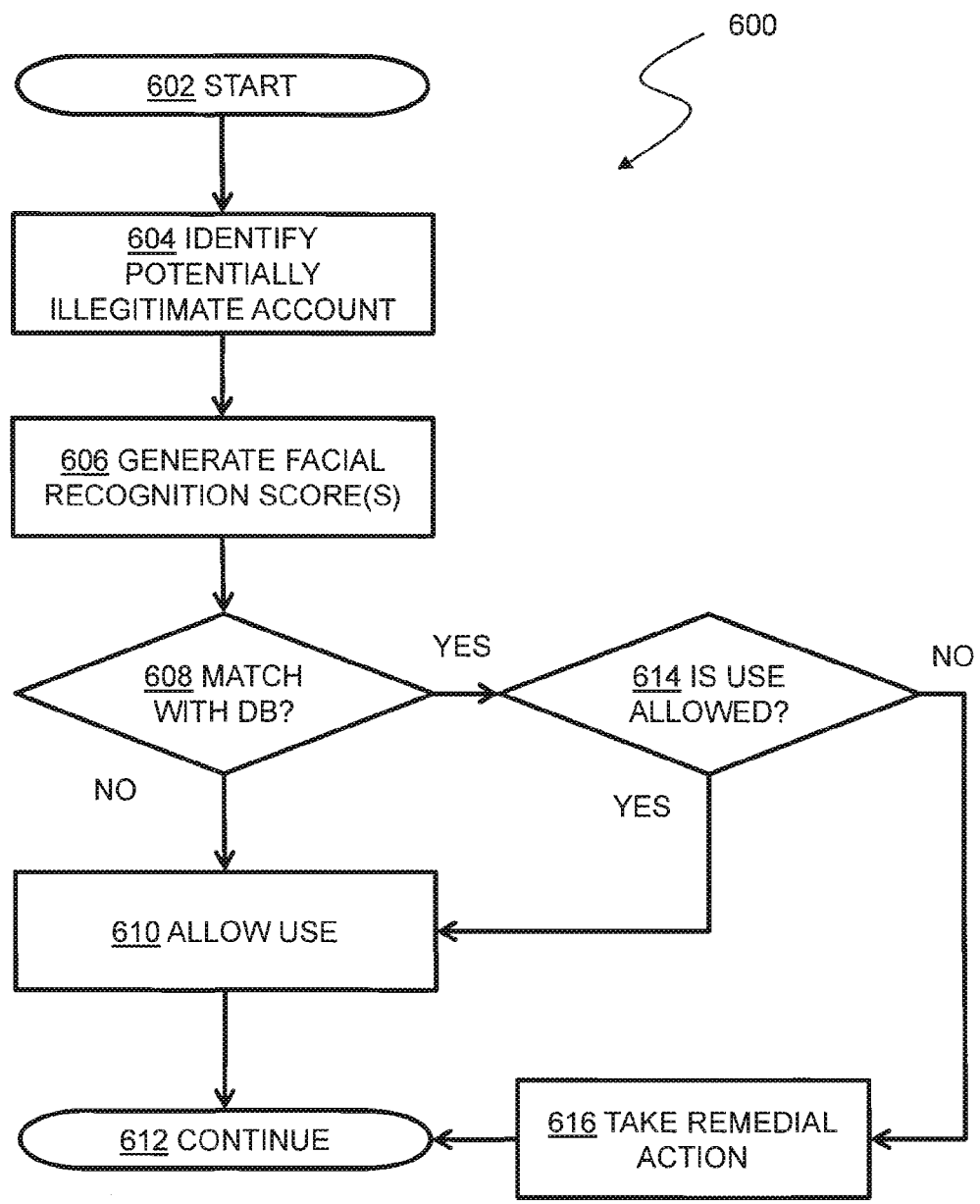
FIG. 6 is another exemplary flow chart.

Referring to flow chart 600 of FIG. 6, which begins at 602, in still another aspect, another exemplary method of monitoring for inappropriate use of a digital visual medium includes, as shown at 604, identifying a social network account as potentially illegitimate. For example, there may be a variety of signals that suggest an account may be a sock puppet account. For example, one clue is rapid addition of many people to the social graph that the purported account holder has no correspondence with through e-mail, chat, or the like. In such circumstances, the people added to the social graph may not really be known to the account holder. The account holder could be someone trying to rapidly develop a fake profile. This step could be carried out, for example, by a component in engine 120 that monitors growth of the social graph 200.

A further step 606 includes, responsive to the identifying step 604, generating at least one facial recognition score for at least one image of a face in at least one digital visual medium associated with the potentially illegitimate social network account (for example, using module 512). Still further steps include, at step 608, comparing the at least one facial recognition score to a database of facial recognition scores for legitimate users of the social network; and, at step 616, initiating remedial action if the comparing indicates a potential illegitimate use of the digital visual medium associated with the potentially illegitimate social network account. Furthermore in this regard, remedial action could be of any kind discussed elsewhere herein, and could be initiated in any case of a match; however, in many cases, as seen at step 614, an analysis can be conducted to see if the use of the matching photo or video is appropriate (e.g., using any of the criteria discussed with regard to step 314 in FIG. 3). Where there is no match, or where there is a match but use is nevertheless acceptable, use is allowed, as seen at step 610.

Steps 608-616 could be carried out, for example, with verification module 504.

Processing continues at step 612.

Thus, one or more embodiments include investigating suspicious accounts, carrying out facial analysis on photos or videos, and looking for users that match these facial recognition models; then further investigating to see if these users are having their identities stolen. An operator of a social networking site determines that a certain account may be suspicious. Based on that, facial recognition is carried out on images of people in photos uploaded to that account and these are compared to a database of known legitimate users of the service. If it appears as if there is illegitimate use, appropriate action is taken, such as: denying posting of the photos or videos, or advising the legitimate subject of the photo or video, or sending a warning to the person attempting to establish the sock puppet account, or the like.

Exemplary System and Article of Manufacture Details

One or more embodiments can employ hardware aspects or a combination of hardware and software aspects. Software includes but is not limited to firmware, resident software, microcode, etc. One or more embodiments or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments or elements thereof can be implemented in the form of an apparatus including a memory and at least one processor that is coupled to the memory and operative to perform, or facilitate performance of, exemplary method steps.

Yet further, in another aspect, one or more embodiments or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 4:
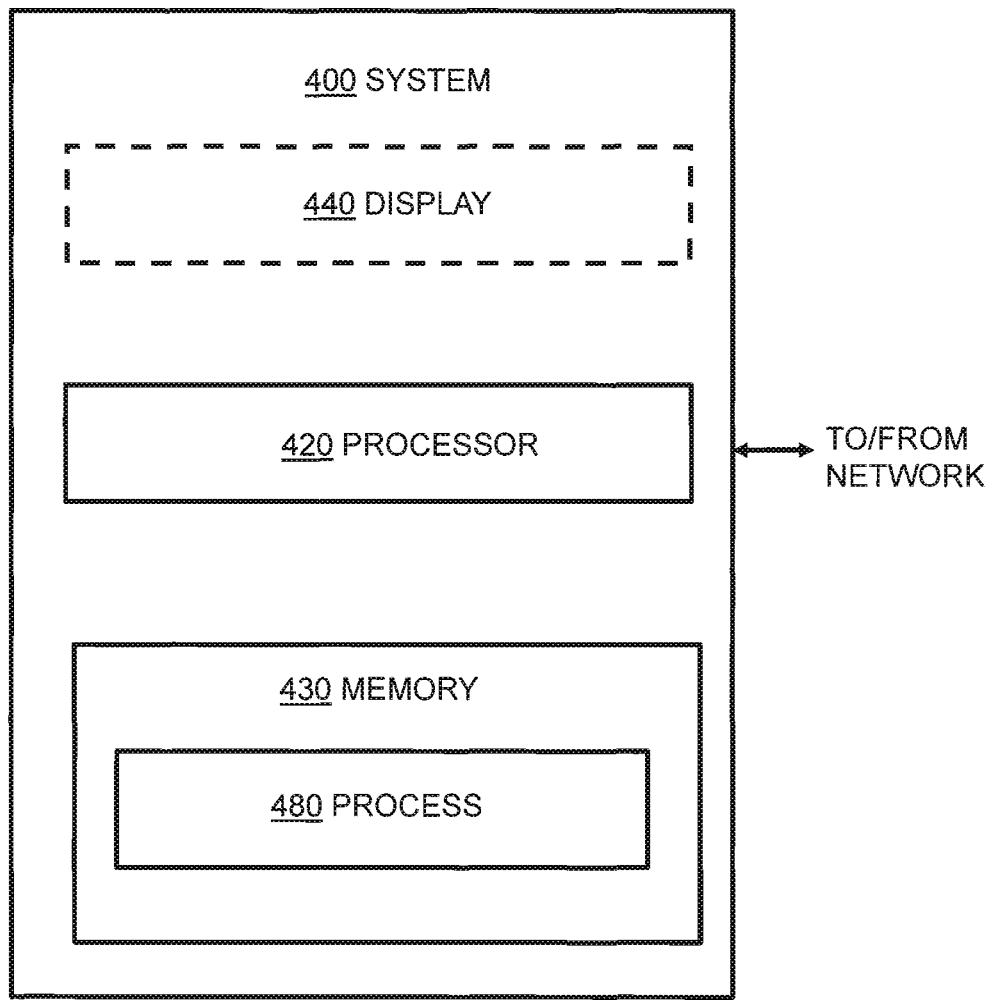
FIG. 4 is a block diagram of an exemplary computer system useful in one or more embodiments described herein.

FIG. 4 is a block diagram of a system 400 that can implement part or all of one or more aspects or processes. As shown in FIG. 4, memory 430 configures the processor 420 to implement one or more aspects of the methods, steps, and functions disclosed herein (collectively, shown as process 480 in FIG. 4). Different method steps can be performed by different processors. The memory 430 could be distributed or local and the processor 420 could be distributed or singular. The memory 430 could be implemented as an electrical, magnetic or optical memory, or any combination of these or other types of storage devices. It should be noted that if distributed processors are employed, each distributed processor that makes up processor 420 generally contains its own addressable memory space. It should also be noted that some or all of computer system 400 can be incorporated into an application-specific or general-use integrated circuit. For example, one or more method steps could be implemented in hardware in an ASIC rather than using firmware. Display 440 is representative of a variety of possible input/output devices (e.g., keyboards, mice, and the like) that may be used on clients and/or servers. Every processor may not have a display, keyboard, mouse or the like associated with it. Note that comments regarding computer system 400 are also generally applicable to clients 102, and their components, and to server device 104, and its components.

In one or more embodiments, memory 108, 118, 430 configures a processor 110, 116, 420 to implement one or more methods, steps, and functions (collectively referred to as a process). The memory 108, 118, 430 could be distributed or local and the processor 110, 116, 420 could be distributed or singular. Different steps could be carried out by different processors.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 102, 104, 400), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is not defined to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments can include a computer program including computer program code means adapted to perform one or all of the steps of any methods or claims set forth herein when such program is run, for example, on system 102, 104, 400, and the like, and that such program may be embodied on a tangible computer readable recordable storage medium. As used herein, including the claims, a "server" includes a physical data processing system running a server program. It will be understood that such a physical server may or may not include a display, keyboard, or other input/output components. Furthermore, it should be noted that any of the methods described herein can include an additional step of providing a system including distinct software modules embodied on one or more tangible computer readable storage media. All the modules (or any subset thereof) can be on the same medium, or each can be on a different medium, for example. The modules can include any or all of the components shown in the figures (e.g. social networking engine 120, digital visual medium verification module 504; and social network database interface module 514). Social networking engine 120 can optionally include tagger 508, parser 506, digital fingerprinting and/or watermarking module 510, and pattern recognition module 512. In other instances, some or all of these components could be separate from digital visual medium verification module 504. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules. In one or more embodiments, memories 108, 118, 430 include tangible computer-readable recordable storage media as well as (volatile) memory on or accessible to the processor; code on one or more tangible computer-readable recordable storage media is loaded into the volatile memory and configures the processors to implement the techniques described herein.

Accordingly, it will be appreciated that one or more embodiments can include a computer program including computer program code means adapted to perform one or all of the steps of any methods or claims set forth herein when such program is implemented on a processor, and that such program may be embodied, in a non-transitory manner, on a tangible computer readable recordable storage medium. Further, one or more embodiments can include a processor including code adapted to cause the processor to carry out one or more steps of methods or claims set forth herein, together with one or more apparatus elements or features as depicted and described herein.

Although illustrative embodiments have been described herein with reference to the accompanying drawings, it is to be understood that those precise embodiments are non-limiting, and that various other changes and modifications may be made by one skilled in the art.

What is claimed is:

1. A method of monitoring for inappropriate use of a digital visual medium, the method comprising the steps of:
   obtaining, at a social network server, a request from a first user to upload a digital visual medium;
   marking the digital visual medium for identification thereof;
   obtaining, at the social network server, a request from a second user to upload the digital visual medium; and
   based on the marking, determining whether the request from the second user to upload the digital visual medium is inappropriate.

2. The method of claim 1, wherein the marking comprises tagging with EXIF meta data.

3. The method of claim 2, wherein the determining comprises detecting the EXIF meta data with a parser.

4. The method of claim 1, wherein the marking comprises digital watermarking.

5. The method of claim 4, wherein the determining comprises detecting the digital watermarking via pattern recognition.

6. The method of claim 1, wherein the marking comprises digital fingerprinting.

7. The method of claim 6, wherein the determining comprises detecting the digital fingerprinting via pattern recognition with a longitudinal component.

8. The method of claim 1, wherein the marking comprises storing, in a database, in association with the digital visual medium, a first facial recognition score.

9. The method of claim 8, wherein the determining comprises:
   calculating a second facial recognition score on the digital visual medium sought to be uploaded by the second user; and
   comparing the first and second facial recognition scores for a match.

10. The method of claim 1, further comprising taking remedial action if the determining step indicates that the request from the second user to upload the digital visual medium is inappropriate.

11. The method of claim 1, further comprising refraining from storing the digital visual medium in response to the request from the second user, if the determining step indicates that the request from the second user to upload the digital visual medium is inappropriate.

12. The method of claim 1, further comprising:
   inaccessibly storing the digital visual medium in response to the request from the second user; and
   refraining from making the digital visual medium available in response to the request from the second user, if the determining step indicates that the request from the second user to upload the digital visual medium is inappropriate.

13. The method of claim 1, wherein, in the obtaining step, the digital visual medium comprises a digital photograph.

14. The method of claim 1, wherein, in the obtaining step, the digital visual medium comprises a digital video.

15. The method of claim 1, wherein the determining comprises disallowing the request from the second user unless the digital visual medium is shared via an approved built-in re-sharing feature.

16. The method of claim 1, wherein the determining comprises disallowing the request from the second user unless the first user gives consent after being contacted once the request from the second user is obtained.

17. The method of claim 1, wherein the determining comprises disallowing the request from the second user unless the first user and the second user are separated, in a social network associated with the social network server, by a social graph distance less than a predetermined threshold.

18. The method of claim 1, further comprising providing a system, wherein the system comprises distinct software modules, each of the distinct software modules being embodied in a non-transitory manner on a tangible computer-readable recordable storage medium, and wherein the distinct software modules comprise a social network engine user interface module and a digital visual medium verification module;
wherein:
the obtaining of the requests from the first and second users is carried out by the social network engine user interface module executing on at least one hardware processor of the social network server;
the marking of the digital visual medium is carried out by the digital visual medium verification module executing on the at least one hardware processor of the social network server; and
the determining of whether the request from the second user is inappropriate is carried out by the digital visual medium verification module executing on the at least one hardware processor of the social network server.

19. An article of manufacture comprising a computer program product for monitoring for inappropriate use of a digital visual medium, the computer program product comprising:
a tangible computer-readable recordable storage medium, storing in a non-transitory manner computer readable program code, the computer readable program code comprising:
computer readable program code configured to obtain, at a social network server, a request from a first user to upload a digital visual medium;
computer readable program code configured to mark the digital visual medium for identification thereof;
computer readable program code configured to obtain, at the social network server, a request from a second user to upload the digital visual medium; and
computer readable program code configured to, based on the marking, determine whether the request from the second user to upload the digital visual medium is inappropriate.

20. The article of manufacture of claim 19, wherein the computer readable program code configured to mark comprises computer readable program code configured to tag with EXIF meta data.

21. The article of manufacture of claim 20, wherein the computer readable program code configured to determine comprises computer readable program code configured to detect the EXIF meta data via parsing.

22. The article of manufacture of claim 19, wherein the computer readable program code configured to mark comprises computer readable program code configured to carry out digital watermarking.

23. The article of manufacture of claim 22, wherein the computer readable program code configured to determine comprises computer readable program code configured to detect the digital watermarking via pattern recognition.

24. The article of manufacture of claim 19, wherein the computer readable program code configured to mark comprises computer readable program code configured to carry out digital fingerprinting.

25. The article of manufacture of claim 24, wherein the computer readable program code configured to determine comprises computer readable program code configured to detect the digital fingerprinting via pattern recognition with a longitudinal component.

26. The article of manufacture of claim 19, wherein the computer readable program code configured to mark comprises computer readable program code configured to store, in a database, in association with the digital visual medium, a first facial recognition score.

27. The article of manufacture of claim 26, wherein the computer readable program code configured to determine comprises:
computer readable program code configured to calculate a second facial recognition score on the digital visual medium sought to be uploaded by the second user; and
computer readable program code configured to compare the first and second facial recognition scores for a match.

28. The article of manufacture of claim 19, further comprising computer readable program code configured to take remedial action if the determining step indicates that the request from the second user to upload the digital visual medium is inappropriate.

29. A social network server apparatus for monitoring for inappropriate use of a digital visual medium, the apparatus comprising:
a memory; and
at least one processor, coupled to the memory, and operative to:
obtain a request from a first user to upload a digital visual medium;
mark the digital visual medium for identification thereof;
obtain a request from a second user to upload the digital visual medium; and
based on the marking, determine whether the request from the second user to upload the digital visual medium is inappropriate.

30. The apparatus of claim 29, further comprising a plurality of distinct software modules, each of the distinct software modules being embodied on tangible computer-readable recordable storage medium, and wherein the distinct software modules comprise a social network engine user interface module and a digital visual medium verification module;
wherein:
the at least one processor is operative to obtain the requests from the first and second users by executing the social network engine user interface module;
the at least one processor is operative to mark the digital visual medium for identification thereof by executing the digital visual medium verification module; and
the at least one processor is operative to determine whether the request from the second user is inappropriate by executing the digital visual medium verification module.

31. An apparatus for monitoring for inappropriate use of a digital visual medium, the apparatus comprising:
- means for obtaining a request from a first user to upload a digital visual medium;
- means for marking the digital visual medium for identification thereof;
- means for obtaining a request from a second user to upload the digital visual medium; and
- means for, based on the marking, determining whether the request from the second user to upload the digital visual medium is inappropriate.

\* \* \* \* \*